United States Patent
Lamke et al.

(10) Patent No.: US 6,802,572 B2
(45) Date of Patent: Oct. 12, 2004

(54) BRAKE CONTROL SYSTEM

(75) Inventors: Isidore I. Lamke, Washington, MO (US); Robert D. Plummer, Union, MO (US); Michael E. Dinan, Leslie, MO (US); Eugene P. Reinhold, Kirkwood, MO (US)

(73) Assignee: N.I.R., Inc., Washington, MO (US)

( * ) Notice: Subject to any disclaimer, the term of this patent is extended or adjusted under 35 U.S.C. 154(b) by 0 days.

(21) Appl. No.: 09/971,339

(22) Filed: Oct. 4, 2001

(65) Prior Publication Data

US 2002/0038974 A1 Apr. 4, 2002

Related U.S. Application Data

(60) Provisional application No. 60/237,896, filed on Oct. 4, 2000.

(51) Int. Cl.[7] .............................................. B60T 13/00
(52) U.S. Cl. ...................... 303/7; 188/112 R; 188/3 H; 303/10; 303/20
(58) Field of Search ............................... 303/20, 10, 7, 303/15, 123, 124, 11, 12; 188/112 R, 112 A, 3 H, 3 R, 152, 358, 359; 307/10.1, 10, 8; 701/76, 70; 340/438

(56) References Cited

U.S. PATENT DOCUMENTS

| | | | |
|---|---|---|---|
| 3,350,142 A | * | 10/1967 | Schuman ..................... 303/10 |
| 3,780,832 A | * | 12/1973 | Marshall |
| 3,887,238 A | | 6/1975 | Bennett |
| 3,897,979 A | * | 8/1975 | Vangalis et al. ............... 303/20 |
| 3,909,075 A | | 9/1975 | Pittet, Jr. et al. |
| 3,951,464 A | * | 4/1976 | Donahue et al. ................ 303/7 |
| 3,953,084 A | | 4/1976 | Pittet, Jr. et al. |
| 3,955,652 A | | 5/1976 | Nilsson et al. |
| 3,981,542 A | | 9/1976 | Abrams et al. |
| 3,990,749 A | | 11/1976 | Mizen et al. |
| 4,099,790 A | | 7/1978 | Hipps |
| 4,280,737 A | | 7/1981 | Hipps |
| 4,370,714 A | * | 1/1983 | Rettich et al. ................ 303/20 |
| 4,402,553 A | | 9/1983 | Hipps |
| 5,342,117 A | * | 8/1994 | Price et al. ............... 188/112 A |
| 5,346,289 A | * | 9/1994 | Cords et al. .................... 303/7 |
| 5,411,321 A | | 5/1995 | Harness |
| 5,626,402 A | | 5/1997 | Saffran |
| 5,779,324 A | * | 7/1998 | Cords et al. .................... 303/7 |
| 6,050,649 A | | 4/2000 | Hensley |
| 6,158,823 A | * | 12/2000 | Schuck .......................... 303/7 |
| 6,364,432 B1 | * | 4/2002 | Mixon ........................... 303/7 |
| 6,445,993 B1 | * | 9/2002 | Eccleston et al. ............. 701/70 |

* cited by examiner

*Primary Examiner*—Douglas C. Butler
(74) *Attorney, Agent, or Firm*—Polster, Lieder, Woodruff & Lucchesi, L.C.

(57) ABSTRACT

A brake control system for towed vehicles is disclosed which provides for controlled application of hydraulic brakes in a towed vehicle in response to the application of the brakes of the towing vehicle. The system is designed in two preferred embodiments. The first embodiment is a self-contained design adapted for use with rental trailers, for example, where a plurality of towed vehicles will be associated with a particular trailer. The second embodiment is intended for hard wiring in connection with the towed and towing vehicles. In each case, superior performance is obtained because the system operates the brake system of the towed vehicle in a unique manner.

16 Claims, 3 Drawing Sheets

BRAKE CONTROL SYSTEM

The present application claims priority to U.S. Provisional Patent Application Ser. No. 60/237,896 filed Oct. 4, 2000.

STATEMENT REGARDING FEDERALLY SPONSORED RESEARCH OR DEVELOPMENT

BACKGROUND OF THE INVENTION

This invention relates to braking systems, in more particular, to brake control systems adapted to engage the brakes of a towed vehicles when the brakes of the towing vehicle are actuated so as to causes the brakes of the towed vehicle to assist the brakes of the towing vehicle in stopping the two vehicles. There are a number of patents and designs for braking systems intended to be employed with one vehicle being towed by another. When a vehicle is being towed by another vehicle, the braking system of the towing vehicle must function to stop both the towing vehicle and the towed vehicle, unless some auxiliary braking control is provided. The extra force of the towed vehicle on the braking system of the towing vehicle requires extra stopping distance and extra stopping time for the two vehicles. The extra weight of the towed vehicle also accelerates the wear and tear of the braking system of the towing vehicle thus increasing the frequency of repairs.

It has long been known that it is possible to provide a system that applies braking force to the towed vehicle in response to brake actuation in the towing vehicle. Trailers of various size and shape, intended for towing by a towing vehicle conventionally include brake systems that are either hydraulically or electrically operated. A number of prior art devices are intended to operate with the towed vehicle braking system. While these prior art devices are acceptable for their intended purposes, they have not solved a number of problems associated with towing a second vehicle. In particular, these systems generally do not function to cause the braking system of the towed vehicle to operate as quickly as is desirable in braking situations. In addition, the prior art designs do not function properly in a number of specific operating situations. Prior art systems in which we are aware of do not engage the brakes of the towed vehicle during backing up of the two vehicles. This can be especially important, for example, in situations in which the towed vehicle is a boat type trailer and it is desired to back the trailer down an extended boat ramp.

In general, there are two types of braking systems available for trailers. Legal requirement specify that all trailers that require brakes have means for activating the trailer brakes under trailer breakaway conditions. In hydraulic surge brake systems this is normally done by means of a cable or chain which is connected to the tow vehicle. Under trailer breakaway conditions, the connecting link is designed to provided mechanical activation of the master cylinder, and to maintain brake system operation as the trailer stops. If the trailer has an electric brake system, the emergency breakaway regulations require that the trailer be provided with an emergency battery back-up system that will provide electrical power to the brake magnets during trailer breakaways. In an electric breakaway system there is a breakaway switch with a pull pin and cable which, when attached to the tow vehicle provides electrical activation of the trailer brakes if the trailer disconnects from the tow vehicle during highway travel, for example. The components for this system are normally packaged as an emergency breakaway kit which has a battery and charger, emergency switch, and battery case in one package.

Hydraulic surge brakes are a totally trailer self-contained braking system, requiring no electrical, hydraulic or other connection of brake sensing components to the towed vehicle for automatic operation of the trailer brakes. In a hydraulic surge brake system, the differential pressure developed between the towing vehicle and the trailer, during the braking process, creates a mechanical pressure which is applied to the push rod of the master cylinder in a hydraulic surge brake coupler. This mechanical pressure is proportional to the difference in pressure between the two vehicles and therefore, the hydraulic output of the brake coupler, and resulting brake operation, is automatic, regulated, and proportional to the amount of braking being applied by the towing vehicle.

These various systems, though effective, are not without hidden problems. For example, the hydraulic surge brake system requires a certain amount of forward pressure to be effective. Backing a trailer up a hill puts pressure on the system and actuates the trailer brakes when the brakes are least needed. Backing a surge system down a hill takes away pressure and the trailer free wheels, leaving no chance of brake activation. Electric brakes work well in dry conditions, however, electric brakes are not recommended for boat trailers.

The brake control system of the present invention is intended for application with surge brake systems to increase their efficiency. Certain components of the system also can be applied to electrical brake systems to improve their operation. A particularly hazardous condition can exist with respect to rental trailers which are attached to a tow vehicle without really evaluating the safety features, and particularly the brake features of the vehicle being towed. In one embodiment of the invention, the braking system is self-contained and is installed on the towed vehicle, requiring only an interconnection to the brake light system of the towing vehicle for operation. Other embodiments of invention include a hard wire system intended for use with a single towing vehicle and trailer, for example, in the common recreational use of the system.

BRIEF SUMMARY OF THE INVENTION

In view of the foregoing, as an object of the present invention to provide a brake control system that selectively actuates and deactuates the brake system of a towed vehicle in response to the activation and unactivation of the brake system of a towing vehicle.

Another object of the present invention is to provide an auxiliary brake system that actuates and deactuates the brake system of a towed vehicle in response to an electric signal that is carried from the towing vehicle to the towed vehicle.

Still another object of the present is to provide a brake control system that uses the existing brakes and/or brake lines of the towed vehicle.

A further object of the present invention is to provide a brake control system that uses a hydrostatic pump to apply pressure to the existing brakes and brake lines of the towed vehicle to create braking forces.

Still a further object of the present invention is to provide an auxiliary brake actuator that may be easily retrofit on a variety of vehicles that are typically towed behind another vehicle.

Another object of this invention is to provide a brake control system which, in one exemplary design, is self-contained and is installed on the towed vehicle.

Yet another object of this invention is to provide a brake control system that is microprocessor controlled.

Another object of the present invention is to provide a brake control system that is of relatively simple construction, which achieves the stated objectives in a simple effective and inexpensive manner, and which solves the problems associated with known braking systems employed with towed vehicles.

In accordance with this invention, generally stated, a brake control system has a microprocessor control adapted for use in a variety of applications. In one embodiment, the system is self-contained and is intended for attachment to the towed vehicle, the towed vehicle having a hydraulic brake system. The control includes a motor driven hydrostatic pump. The motor and pump are attached to a reservoir of brake fluid and the unit is attached to the hydraulic system of the towed vehicle. A battery provides power to the motor. A microprocessor controls application of electrical energy to the pump motor, and controls charging current to the battery. Other embodiments of the invention distribute the components of the control system between the towing vehicle and the towed vehicle.

BRIEF DESCRIPTION OF THE SEVERAL VIEWS OF THE DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention. It describes several embodiments, adaptations, variations, alternatives and uses of the invention, including what we presently believe is the best mode of carrying out the invention. As various changes could be made in the these constructions without departing from the scope of the invention, it is intended that all matter contained in the description or shown in the accompanying drawings shall be interpreted as illustrative and not in a limiting sense.

Figure 1:
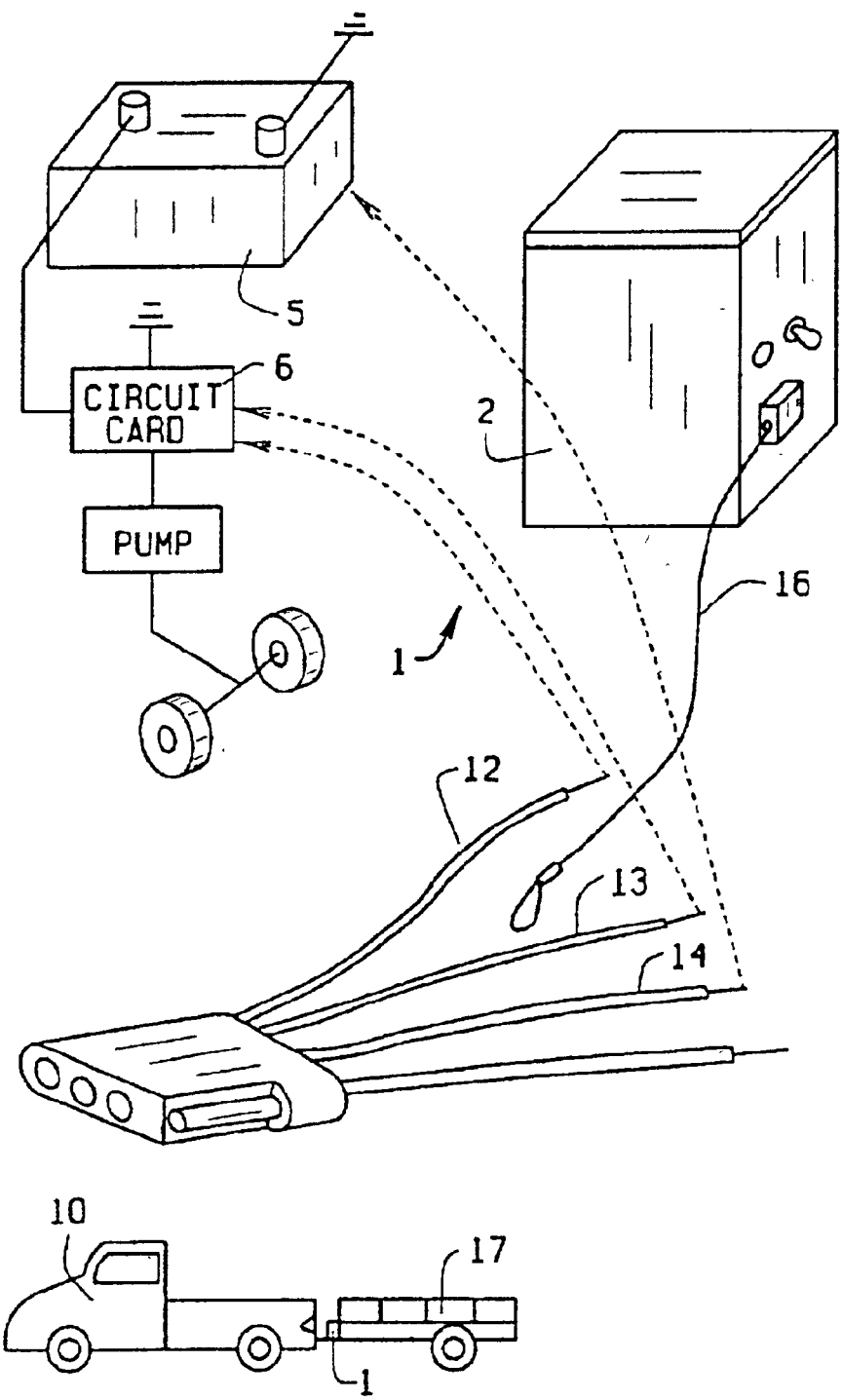
FIG. 1 is a diagrammatic view of one illustrative embodiment of the brake control system of the present invention.

Referring now to FIG. 1, reference numeral 1 indicates one illustrative embodiment of the brake control system of the present invention. The brake control system 1 includes an enclosure 2 which functions to house a plurality of components, including a motor 3 and a pump 4. Also mounted with the enclosure 2 are a battery 5 and a microprocessor 6.

The system shown in FIG. 1 is the self-contained unit, and all components mentioned above fit and attach neatly to and/or into the enclosure 2. Installation of the unit is as easy as mounting the enclosure 2 to a trailer (or other towed vehicle) 17, and connecting the brake line of the trailer to a fluid fitting under the enclosure 2, not shown. The motor 3 of the motor/pump combination is conventional and is driven by the battery 4 through the microprocessor 6. The battery 5 is a conventional 12 volt battery, and the motor 3 is intended to operate from the 12 volts through a power modulator 7 associated with the microprocessor 6.

The microprocessor 6 includes a relay time function 8 which is interposed between the processor 6 and the battery 5. As seen in FIG. 1, the interconnection between the system 1 and the towing vehicle 10 is accomplished through a single interconnection 11. The interconnection 11 includes a first line 12 and a second line 13 which provide electrical input to the microprocessor 6 and corresponds to the right turn signal/brake and the left turn signal/brake input from the brake lights of the vehicle 10. A third line 14 is connected to a charging circuit 15 which in turn is connected to the microprocessor 6 and enables the microprocessor 6 to control charging to the battery 5 whenever at least the taillight switch of the vehicle 10 is on.

As shown in FIG. 1, a breakaway switch 16 is operatively connected between the towed vehicle 17 and the towing vehicle 10 and is connected to the enclosure 2, in the embodiment illustrated. The breakaway 16 in turn is electrically connected to the microprocessor 6 and operates to cause the microprocessor 6 to apply braking signals to the motor 3 in the event of towing vehicle breakaway during use. Also shown in FIG. 1, is an on/off switch 17 which removes power from the system 1.

Figure 4:
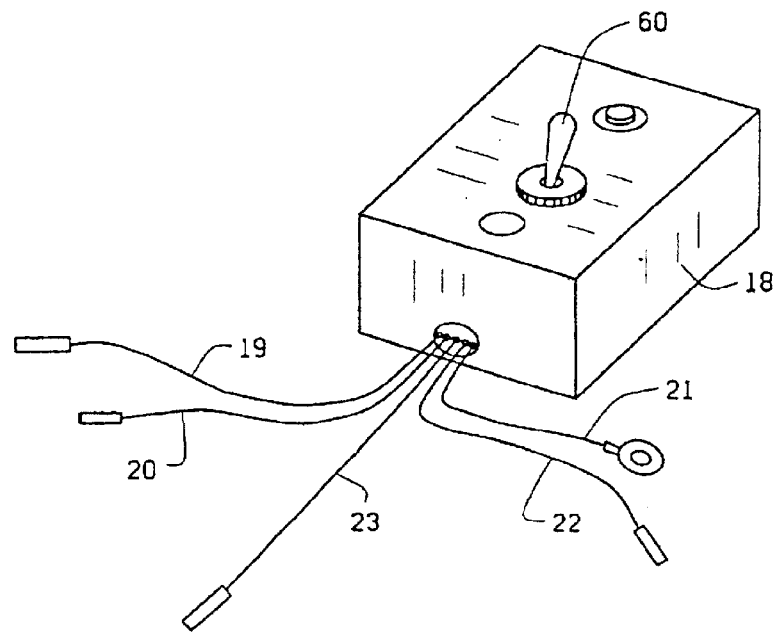
FIG. 4 is diagrammatic view of a distribution system for permanently wired system intended for a single and user application.
Figure 4:
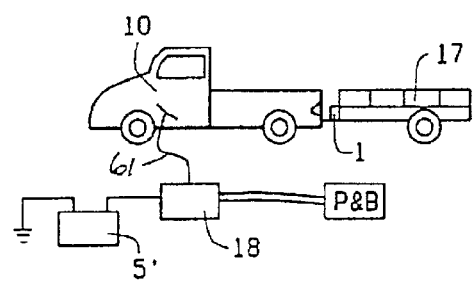

Referring now to FIG. 4, a permanent single end user system as shown in which certain of the components of the system are distributed between the towing vehicle 10 and the towed vehicle 17. In this particular embodiment, a relay box 18 is preferably mounted under the hood of the vehicle 10, near the vehicle battery 5'. An on/off switch 60 of the relay box applies power to the pump 4 through leads 19 and 20. Leads 21 and 22 are connected to the battery 5' and the unit transmits the power from the battery 5' to the motor 3. A lead 23 is operatively connected to a brake pedal motion detector 61.

Figure 2:
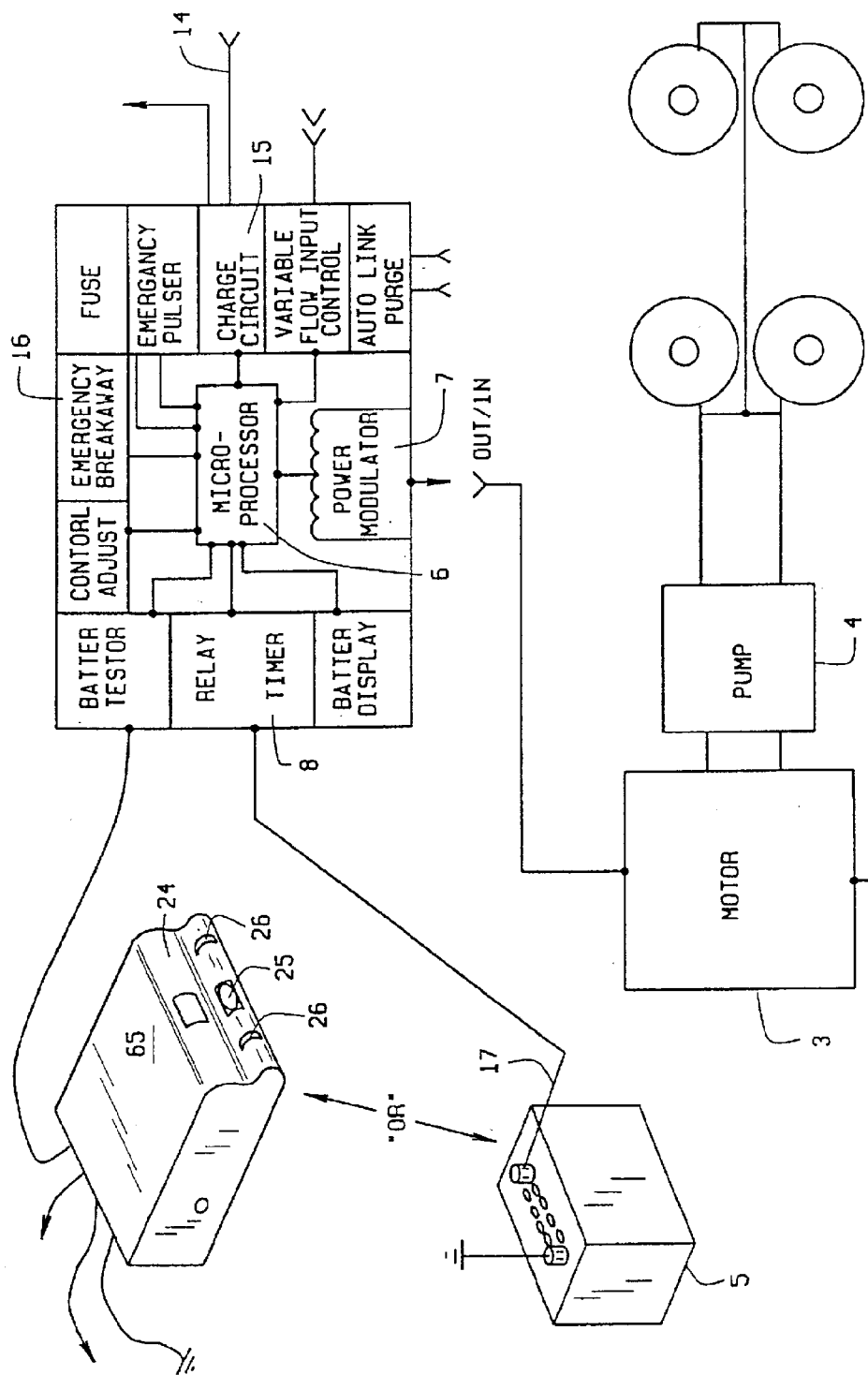
FIG. 2 is a diagrammatic view of the brake system of FIG. 1 showing a distribution of the system to a towed vehicle.
Figure 3:
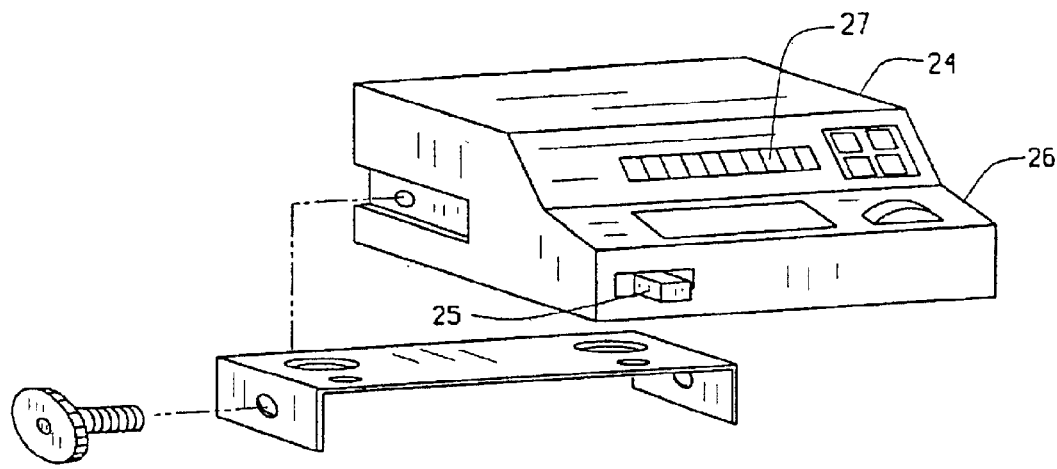
FIG. 3 is a diagrammatic view of the brake control system of a towing vehicle control unit adaptable for use with either electric or hydraulic brakes on a towed vehicle.

The switch enclosure 18 may be replaced by an under dash unit 24, if desired. The unit 24 may assume a variety of esthetic design configurations, and two such configurations as shown in FIG. 2 and FIG. 3, for example. Regardless of the configuration, the unit 24 is designed to operate with either hydraulic or electric brakes, and a mode switch 25 is provided to adjust the brake control system with the types of brakes being employed in the towed vehicle 17. In the embodiment illustrated in FIGS. 2 and 3, a power dial position selector switch 26 also is provided.

Merely by way of example, the selector switch 26 may contain the following functions. For example, we have chosen the position 1 as being the off mode, which would be used when the towed vehicle is parked for any length of time. Switch selection No. 2, is in the embodiment illustrated, the battery connection mode and shows the battery voltage on a scale 27. This selection will also let the operator know when the battery should be charged. As indicated above, charging may be accomplished merely by turning on the vehicle lights so that the microprocessor 6 actuates the charging circuit for the battery 12 in those units in which the battery 12 is mounted on the towed vehicle 17. Switch selection No. 3 is the back-up mode. As indicated above, this allows the user to back up any hydraulic trailer regardless of whether the backup is occurring up hill or down hill. This setting offers an on command of the brakes for the trailer 17 for as long as the brake pedal of the towing vehicle is depressed. This is an important feature for trailers employed with recreational boats, for example, in that it is common for such trailers to be backing down long extended boat ramps.

The next seven selections gives the user multiple power settings for the brakes. The dial starts from a minimum to maximum pressure setting. This allows the user to adjust for conditions in the towed vehicle 17. This is particularly important to adjust the system operation between loaded and unloaded trailers or other towed vehicles, for example.

The relay timer circuit 8 is an important feature of our invention. This system allows braking pressure to be constant for 8 seconds from the time the brake pedal in the towing vehicle is depressed. Each time the pedal is depressed, the timing function resets and the brakes continue to operate. This feature allows a vehicle to travel down long steep grades without dragging the brakes. After 8 seconds of continuous braking, the timer circuit disengages the brakes, forcing the release and reapplication of the brake pedal of the towing vehicle. This action allows for improved operation of both the towing vehicle and the towed vehicle brakes.

Regardless of the configuration of the system, operation of the braking control system of the present invention is relatively simple to understand. Upon initial braking, the microprocessor 6 drives the motor pump into a spin up mode. The function insures a quick response from the electronic signal to the pressurizing of the brakes. Once spin up produces pressure to the brake lines, the pressure returns to the brake pressure setting that the driver has dialed on the control board. The control board, in the embodiment of FIG. 1, is located on the left side of the housing with LED light display and control adjust knob in plain view from the driver side of the vehicle. Operation of the system thereafter follows in tandem with the application of brakes in the first or towing vehicle.

One test conducted on the control system of the present invention, a truck having a weight of 5,400 lbs. with a trailer having a weight of 12,600 lbs. on a day with the temperature of 55° F., dry pavement showed the following results. From initial start of 55 M.P.H panic stop with ABS breaking and the towing vehicle. The trailer had two axles.

Braking with truck only 350 feet.

Braking with utilizing the trailer only 578 feet.

Braking with trailer and truck 262 feet.

It may thus be observed that the brake system of this invention provides substantially improved braking capability for vehicles being towed, while providing functionality not found in prior art designs.

Numerous variations, will be apparent to those skilled in the art in light of the foregoing description and accompanying drawings. For example, the location of various units of the equipment may be varied in other embodiments of the invention. As indicated, the design silhouettes for certain components may be altered. While hard wiring was indicated with respect to certain applications and signal transmissions between the towing vehicle and the towed vehicle, those skilled in the art will recognize that radio transmissions or infrared or other forms of electromagnetic or light transmissions may be employed in other embodiments of the invention. These variations are merely illustrative.

What is claimed is:

1. A brake control system for a multiple towing arrangement, comprising:

a unit installed on a towed vehicle, including a hydrostatic pump, and a drive motor for the pump, the pump being operatively connected to a brake system of the towed vehicle to control operation thereof;

a control unit operatively connected to at least one parameter of a towing vehicle, said control unit operative to apply power to the motor for said pump; and a breakaway switch operatively connected between the control unit and the towing vehicle;

wherein the control unit is comprises a switch capable of a plurality of positions, a first position causing the control unit to enter an "off" mode, a second position causing the control unit to enter a backup mode wherein the brake system of the towed vehicle is applied for as long as a brake pedal of the towing vehicle is depressed, and further positions each associated with a different power setting of towed vehicle brake application and wherein the control unit initiates a timer function to apply the brakes of the towed vehicle for no more than a predetermined amount of time at the selected power level when the towing vehicle braking system is applied regardless of whether the braking system of the towing vehicle continues to be applied after the predetermined period of time and after which time the braking system of the towing vehicle must be released and reapplied in order to reset the timer function and reapply the braking system of the towed vehicle for another length of the predetermined time.

2. The brake control system of claim 1 further including a battery for supplying electrical energy to the motor through said control unit.

3. The brake control system of claim 2 wherein said battery is mounted on the towed vehicle and is rechargeable from the towing vehicle.

4. The brake control system of claim 1 wherein said unit is direct wired to the towing vehicle, the battery power for said motor being supplied by a battery in the towing vehicle.

5. The brake control system of claim 4 wherein said unit is adapted to assist either electric or hydraulic brakes of the towing vehicle, further including a selector unit mounted in the towing vehicle for selecting the brake system.

6. A brake control system comprising:

a first unit mounted on a vehicle to be towed, the first unit including an electric motor and a pump, a reservoir of hydraulic fluid associated with the pump, and a connection between the pump and a brake system of the towed vehicle;

a battery for supplying power to the motor;

a microprocessor electrically connected to the battery and the first unit; and an interconnection between the microprocessor and a brake system of a towing vehicle to enable the microprocessor to determine when the towing vehicle has brakes applied;

a switch capable of a plurality of positions, a first position causing the microprocessor to enter an "off" mode, a second position causing the microprocessor to enter a "charging mode" mode wherein the battery is charged, a third position causing the microprocessor to enter a backup mode wherein the brake system of the towed vehicle is applied for as long as a brake pedal of the towing vehicle is depressed, and further positions each associated with a different power setting of towed vehicle brake application and wherein the microprocessor initiates a timer function to apply the brakes of the towed vehicle for no more than a predetermined amount of time at the selected power level when the towing vehicle braking system is applied regardless of whether the braking system of the towing vehicle continues to be applied after the predetermined time period and after which time the braking system of the towing vehicle must be released and reapplied in order to reset the timer function and reapply the braking system of the towed vehicle for another length of the predetermined time.

7. The brake control system of claim 6 wherein the battery and microprocessor are associated with the first unit and the only interconnection with the towing vehicle is with the brake system thereof.

8. The brake control system of claim 7 further including a breakaway switch mechanically connected between the towed vehicle and the towing vehicle and electrically connected to the microprocessor.

9. The brake control system of claim 6 wherein the battery for supplying power to the motor is the battery of the towing vehicle and power for the pump and pump motor is supplied from the towing vehicle.

10. A brake control system comprising:
    a first unit mounted on a vehicle to be towed, the first unit including an electric motor and a pump, a reservoir of hydraulic fluid associated with the pump, and a connection between the pump and a brake system of the towed vehicle;
    a battery for supplying power to the motor;
    a microprocessor electrically connected to the battery and the first unit;
    an interconnection between the microprocessor and a brake system of a towing vehicle to enable the microprocessor to determine when the towing vehicle has brakes applied; and
    a switch capable of a plurality of positions, a first position causing the microprocessor to enter an "off" mode, a second position causing the microprocessor to enter a "charging mode" mode wherein the battery is charged, a third position causing the microprocessor to enter a backup mode wherein the brake system of the towed vehicle is applied for as long as a brake pedal of the towing vehicle is depressed, and further positions each associated with a different power setting of towed vehicle brake application and wherein the microprocessor initiates a timer function to apply the brakes of the towed vehicle for no more than a predetermined amount of time at the selected power level when the towing vehicle braking system is applied regardless of whether the braking system of the towing vehicle continues to be applied after the predetermined time period and after which time the braking system of the towing vehicle must be released and reapplied in order to reset the timer function and reapply the braking system of the towed vehicle for another length of the predetermined time.

11. The control system of claim 10 wherein the battery and microprocessor are associated with the first unit and the only interconnection with the towing vehicle is through the brake system thereof.

12. The control system of claim 11 further including an enclosure, the enclosure having said pump, motor, battery, and microprocessor physically associated with it.

13. The brake control system of claim 10 for supplying power to the motor is associated with the towing vehicle.

14. The brake control system of claim 13 wherein the battery is mounted on the towed vehicle and is rechargeable from the towing vehicle.

15. The brake control system of claim 14 wherein said unit is directly wired to the vehicle.

16. The brake control system of claim 15 wherein said unit is adapted to assist either electric or hydraulic brakes of the towing vehicle, further including a selector switch mounted in the towing vehicle for selecting the applicable brake system of the towing vehicle.

* * * * *